(12) United States Patent
Muenter et al.

(10) Patent No.: US 7,154,591 B2
(45) Date of Patent: Dec. 26, 2006

(54) LASER RANGE FINDING APPARATUS

(75) Inventors: Steven E. Muenter, Van Nuys, CA (US); Blair F. Campbell, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 10/791,642

(22) Filed: Mar. 2, 2004

(65) Prior Publication Data

US 2004/0165175 A1    Aug. 26, 2004

Related U.S. Application Data

(63) Continuation-in-part of application No. 10/355,360, filed on Jan. 31, 2003, now Pat. No. 6,781,677.

(51) Int. Cl.
*G01C 3/02* (2006.01)

(52) U.S. Cl. ............... 356/10; 356/3.01; 356/4.01; 356/5.01

(58) Field of Classification Search .............. 356/10
See application file for complete search history.

(56) References Cited

U.S. PATENT DOCUMENTS 3,937,575 A * 2/1976 Bateman ............. 356/5.05
4,928,152 A * 5/1990 Gerardin ............. 356/5.09

(Continued)

OTHER PUBLICATIONS

Publication entitled "A Possible Way for Low-power Short Distance Optical Range Detector Using Regenerative Gain-Switched Laser Diode" by Hung-Tser Lin and Yao-Huang Kao; IEEE Lasers and Electro-Optics Society; 1996 Annual Meeting Conference Proceedings; p. 188.

(Continued)

*Primary Examiner*—Thomas H. Tarcza
*Assistant Examiner*—Luke D. Ratcliffe
(74) *Attorney, Agent, or Firm*—Harness Dickey & Pierce P.L.C.

(57) ABSTRACT

The laser range finding apparatus includes an optical relaxation oscillator assembly, outcoupling optics, a photodetector and a controller. The optical relaxation oscillator assembly produces relaxation oscillations. The relaxation oscillations are a series of optical pulses having a controllable repetition rate. The outcoupling optics receives the series of optical pulses and redirects a minor portion of the energy of the series of optical pulses. A major portion of the energy of the series of optical pulses is adjusted in accordance with first desired beam propagation parameters. A photodetector receives the minor portion and converts the minor portion to an electrical signal representative of the series of optical pulses. A controller receives the electrical signal and determines the repetition period between the optical pulses. The controller provides a controller output to the optical relaxation oscillator assembly for adjusting the controllable repetition rate of the series of optical pulses produced by the optical relaxation oscillator assembly. During operation, the major portion of the energy of the series of optical pulses is directed to a reflecting target, reflected therefrom, collected by the outcoupling optics, and directed back to the optical relaxation oscillator assembly to stimulate subsequent relaxation oscillations, thus locking the period of the relaxations oscillations to the time of flight of the roundtrip path between the laser finding apparatus and the reflecting target.

6 Claims, 4 Drawing Sheets

U.S. PATENT DOCUMENTS

| | | | |
|---|---|---|---|
| 5,267,016 A | | 11/1993 | Meinzer et al. |
| 5,317,376 A | * | 5/1994 | Amzajerdian et al. ..... 356/28.5 |
| 5,359,404 A | | 10/1994 | Dunne |
| 5,594,543 A | | 1/1997 | de Groot et al. |
| 5,748,295 A | * | 5/1998 | Farmer ...................... 356/5.09 |
| 5,949,530 A | * | 9/1999 | Wetteborn ................. 356/5.01 |
| 6,233,045 B1 | | 5/2001 | Suni et al. |
| 6,233,368 B1 | | 5/2001 | Badyal |

OTHER PUBLICATIONS

Lin et al. "A Possible Way for Low-power Short Distance Optical Range Detector Using Regenerative Gain-Switched Laser Diode," IEEE Lasers and Electro-Optics Society 1996 Annual Meeting Conference Proceedings, pp. 188-189, 1996.

* cited by examiner

Pump Power Too Low for Seeded Oscillation

Pump Power Correct for Seeded Oscillation

Pump Power Too High for
Seeded Oscillation

LASER RANGE FINDING APPARATUS

CROSS-REFERENCE TO RELATED APPLICATIONS

This application is a continuation-in-part of U.S. patent application Ser. No. 10/355,360 filed on Jan. 31, 2003, issued on Aug. 24, 2004 as U.S. Pat. No. 6,781,677, the disclosure of which is incorporated herein by reference.

FIELD OF THE INVENTION

The present invention relates to laser range finding systems and more particularly to the detection of return pulses utilizing properties inherent to a laser cavity undergoing relaxation oscillations.

BACKGROUND OF THE INVENTION

Laser range finders operate on the principle of measuring the time of flight of an intense, short duration pulse of energy from the time it is produced by a transmitter assembly to the time the reflected pulse from the downrange target is detected by a receiver assembly. Since the speed of light is a known constant, the time of flight of the pulse can be used to calculate the distance to the downrange target. Laser range finders typically consist of a collection of the following subassemblies: transmitter assembly, receiver assembly and controller assembly.

Presently, many implementations exist for a transmitter assembly to produce the desired high intensity, short duration pulse of energy such as flashlamp pumping or Q-switching of the laser cavity. Beam forming and directing optics are used to focus the pulse on the downrange target. Characteristics of the transmitted pulse, such as temporal profile, spatial profile and wavelength, are preserved in the reflected pulse and may therefore be used to differentiate the reflected pulse from background or other interfering sources. The components of the transmitter assembly are often expensive, bulky and sensitive to misalignment. It would be desirable to eliminate many of these components while still retaining the functionality of the transmitter assembly.

The function of the receiver assembly is to collect the energy from the reflected pulse and detect its time of arrival. This is typically implemented using beam collecting optics to focus the incoming pulse on a photodetector such as a photomultiplier tube or a semiconductor photodiode. The reflected pulse from the downrange target is greatly attenuated due to such effects as atmospheric absorption and scatter, range to the target, diffuse scattering of the reflected pulse from the target and low reflectivity of the target. The peak intensity of the transmitted pulse must be great enough to insure detection of the attenuated return pulse by the receiver assembly under the most stressing conditions. The receiver assembly must also accommodate a wide dynamic range of reflected pulse intensities due to the fact that the intensity of the short time-of-flight return pulse from nearby targets is greater than the long time-of-flight pulses from distant targets. A desirable feature of the receiver assembly is the ability to increase the sensitivity of the receiver detector as a function of time-of-flight synchronized to the timing of the transmitted pulses.

The receiving assembly must also discriminate the return pulse from background interfering sources. The beam collection optics limits the field of view of the detector to the region illuminated by the transmitting assembly. This requires careful alignment of the receiver optics to the transmitter optics. It is more desirable to use the same optical system for both functions, however, the backscattering and retroreflections of the transmitted pulse from the optics may appear with great intensity at the receiver detector, which may result in saturation of the detector.

To further aid the receiver assembly in discriminating the return pulse, narrow band optical filters are used to reject signals that do not match the wavelength of the transmitted pulse. These filters can be costly and may require precise alignment. It would be desirable if the detector were inherently sensitive to only the same wavelength as the transmitted pulse.

The generation of short optical pulses with long repetition rates using electronic regeneration techniques in laser diodes is disclosed by Hung-Tser Lin and Yao-Huang Kao in their article entitled "A Possible Way for Low-power Short Distance Optical Range Detector Using Regenerative Gain-Switched Laser Diode" from the IEEE Lasers and Electro-Optics Society 1996 Annual Meeting Conference Proceedings. However, the pulse regeneration method described uses electronic means to sense the output pulse and modulate the power to the laser diode to induce oscillations. No direct optical feedback is employed in this method.

U.S. Pat No. 4,928,152, issued to Jean-Pierre Gerardin, discloses an apparatus in which the optical signal issued from a laser cavity is reflected by a target and re-injected into the same laser cavity using the same collimating and focusing optics. The purpose of this configuration is to produce heterodyne beat signals as the CW laser diode is frequency modulated. This apparatus uses interferometery to determine distance, rather than measurement of the time-of-flight of an optical pulse.

U.S. Pat. No. 5,359,404, issued to Jeremy G. Dunne, discloses a laser rangefinder which determines the time-of-flight of an infrared laser pulse reflected from a downrange target. This apparatus is inherently sensitive to interfering signal sources and therefore requires additional means for the detection and discrimination of the return pulse. A digital logic-operated gate for the "opening" and "closing" of a time window is required in the optical receiver for the purpose of rejecting interfering optical signal sources, such as internal reflections and atmospheric backscatter. Further filtering is provided by a narrow band interference filter tuned to the wavelength of the emitted laser pulse. Additionally, separate collimating and focusing optics are used in the transmitting and receiving portions of the apparatus.

SUMMARY OF THE INVENTION

It is a principal object of the present invention to provide the necessary functionality for a laser range finding apparatus while significantly reducing the number of components and subsequent cost and complexity by utilizing inherent properties of a laser cavity.

It is another object of the invention to generate optical pulses, suitable for the purposes of range finding, by utilizing a laser cavity in a perturbed mode to induce relaxation oscillations.

It is another object of the invention to minimize the number of optical components by utilizing the same beam conditioning and directing optical assembly for both the transmission of the optical pulse and the collection of the return pulse from the downrange target.

It is another object of the invention to eliminate the high-gain photodetector amplifier electronics in the receiver assembly by optically amplifying the collected return pulse utilizing the gain medium of the same laser cavity used to produce the outgoing pulse.

The present invention is a laser range finding apparatus. In a broad aspect it includes an optical relaxation oscillator assembly, outcoupling optics, a photodetector and a controller. The optical relaxation oscillator assembly produces relaxation oscillations. The relaxation oscillations are a series of optical pulses having a controllable repetition rate. The outcoupling optics receives the series of optical pulses and redirects a minor portion of the energy of the series of optical pulses. A major portion of the energy of the series of optical pulses is adjusted in accordance with first desired beam propagation parameters. A photodetector receives the minor portion and converts the minor portion to an electrical signal representative of the series of optical pulses. A controller receives the electrical signal and determines the repetition period between the optical pulses. The controller provides a controller output to the optical relaxation oscillator assembly for adjusting the controllable repetition rate of the series of optical pulses produced by the optical relaxation oscillator assembly. During operation, the major portion of the energy of the series of optical pulses is directed to a reflecting target, reflected therefrom, collected by the outcoupling optics, and directed back to the optical relaxation oscillator assembly to stimulate subsequent relaxation oscillations, thus locking the period of the relaxations oscillations to the time of flight of the roundtrip path between the laser finding apparatus and the reflecting target.

The present invention eliminates the need for variable gain control of the receiving assembly detector by utilizing the inherent time varying gain property of the relaxation oscillator. The relaxation oscillator provides variable optical amplification as a function of time, synchronized to the time of transmission of the outgoing optical pulse. The amplification is at a minimum after the generation and transmission of the outgoing pulse, thereby preventing amplification and detection of backscatter and retro reflections from the optical assembly. The optical amplification monotonically increases, thereby providing higher gain for typically less intense, longer time-of-flight return pulses from more distant targets.

The present invention eliminates the need for optical filters by utilizing the inherent narrow bandwidth amplification of the laser cavity to amplify only return pulses with a wavelength that is mode matched with the laser cavity. Since the same laser cavity is used for generation of the outgoing pulse, the return pulse is inherently mode matched with the laser cavity. This extremely narrow band amplification effectively filters out all out-of-band background noise and interference sources.

The present invention eliminates the requirement for a large dynamic range of the photodetector amplifier used to detect the return pulses. The return optical pulses are used to seed the subsequent relaxation oscillation in the laser cavity. The intensity of the optical pulse produced by the relaxation oscillation is independent of the intensity of the seed pulse. The photodetector detects the seeded pulses which are of uniform intensity.

Other objects, advantages and novel features will become apparent from the following detailed description of the invention when considered in conjunction with the accompanying drawings.

BRIEF DESCRIPTION OF THE DRAWING

The present invention will become more fully understood from the detailed description and the accompanying drawings, wherein:

FIG. 3a illustrates population inversion as a function of time. FIG. 3b illustrates laser output as a function of time. FIG. 3c illustrates target return as a function of time.

FIG. 4a illustrates population inversion as a function of time. FIG. 4b illustrates laser output as a function of time. FIG. 4c illustrates target return as a function of time.

FIG. 5a illustrates population inversion as a function of time. FIG. 5b illustrates laser output as a function of time. FIG. 5c illustrates target return as a function of time.

DETAILED DESCRIPTION OF THE PREFERRED EMBODIMENTS

Figure 1:
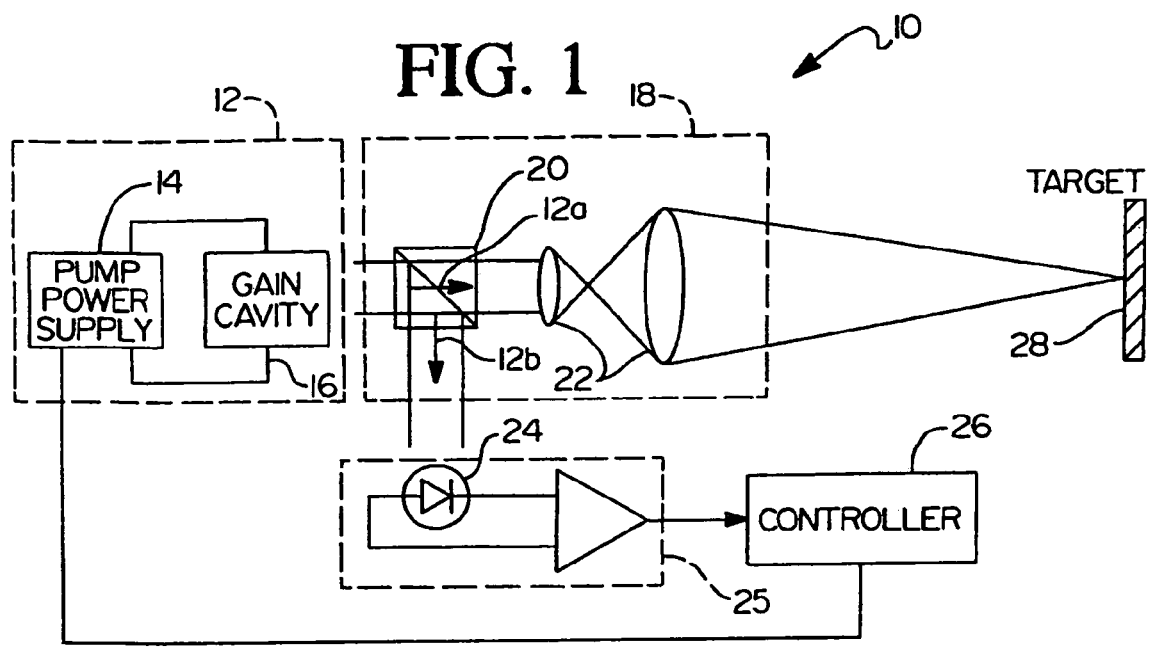
FIG. 1 is a schematic representation of the laser range finding apparatus of the present invention.

Referring now to the drawings and the characters of reference marked thereon, FIG. 1 illustrates a preferred embodiment of the laser finding apparatus of the present invention, designated generally as 10. The laser finding apparatus 10 includes an optical relaxation oscillator assembly, designated generally as 12, for producing relaxation oscillations. The relaxation oscillations produced are a series of optical pulses at a controllable repetition rate. The optical relaxation oscillator assembly 12 preferably includes a power source 14 and a laser gain cavity 16 operably associated with the power source 14 for producing the relaxation oscillations. The power source 14 pumps a gain medium of the optical relaxation oscillator assembly 12, providing a means for controlling a timing profile of a population inversion within the gain medium. The laser gain cavity 16 operates in a perturbed mode to induce relaxation oscillations at a repetition rate influenced by the power source 14. The power source 14 can be, for example, a controllable electric source, an optical source or radio frequency (RF) source.

Outcoupling optics 18 receives the series of optical pulses from the optical relaxation oscillator assembly 12 and redirects a minor portion of the energy of the series of optical pulses, as represented by arrow 12b. A major portion of the energy of the series of optical pulses, represented by arrow 12a, is adjusted in accordance with first desired beam propagation parameters.

The outcoupling optics 18 preferably includes a beamsplitter 20 for redirecting the minor portion of the energy and beam directing optics 22 for providing the adjustment of the major portion. The first desired beam propagation parameters may include, for example, collimation and focus.

The outcoupling optics 18 allows for the injection of photons from optical signals reflected by the target to induce the relaxation oscillations.

A photodetector 24 of a photodetector subsystem 25 receives the minor portion of energy and converts that minor portion to an electrical signal representative of the series of optical pulses. The photodetector 24 used may be, for example, a semiconductor photodiode or a phototube.

A controller 26 receives the electrical signal from the photodetector 24 and determines the repetition period between the optical pulses. The controller 26 provides a controller output to the optical relaxation oscillator assembly 12 for adjusting the controllable repetition rate of the series of optical pulses produced by the optical relaxation oscillator assembly 12. The controller 26 includes means for determining when the repetition period results from a locking of the oscillator assembly 12 because of seed pulses received back into the laser gain cavity 16. Additionally, it includes means for measuring the repetition period. The controller 26 may be, for example, a microcontroller, FPGA (field programmable gate array) or an ASIC (application specific integrated circuit) along with a precision timebase such as a crystal oscillator.

In general operation, to determine the optical distance to a reflecting target 28, the controller 26 generates a signal to ramp the pump power from pump power supply 14 to the laser gain cavity 16 to sweep the relaxation oscillation frequency. This produces a train of optical pulses with a varying period between pulses. The return pulses from the target 28 are imaged back into the laser gain cavity 16. If the pump power is appropriately selected, the population inversion build up rate in the gain medium of the assembly 12 will be timed so that the optical gain exceeds the cavity loss just as the return pulse enters the laser gain cavity 16. This return pulse will act as the seed for the subsequent pulse, thereby shortening the relaxation oscillation period by the spontaneous emission build-up time. The period of the seeded relaxation oscillations equals the time of flight of the round trip path between the laser gain cavity 16 and the target 28. The distance to the target 28 can be determined from this period.

Figure 2:
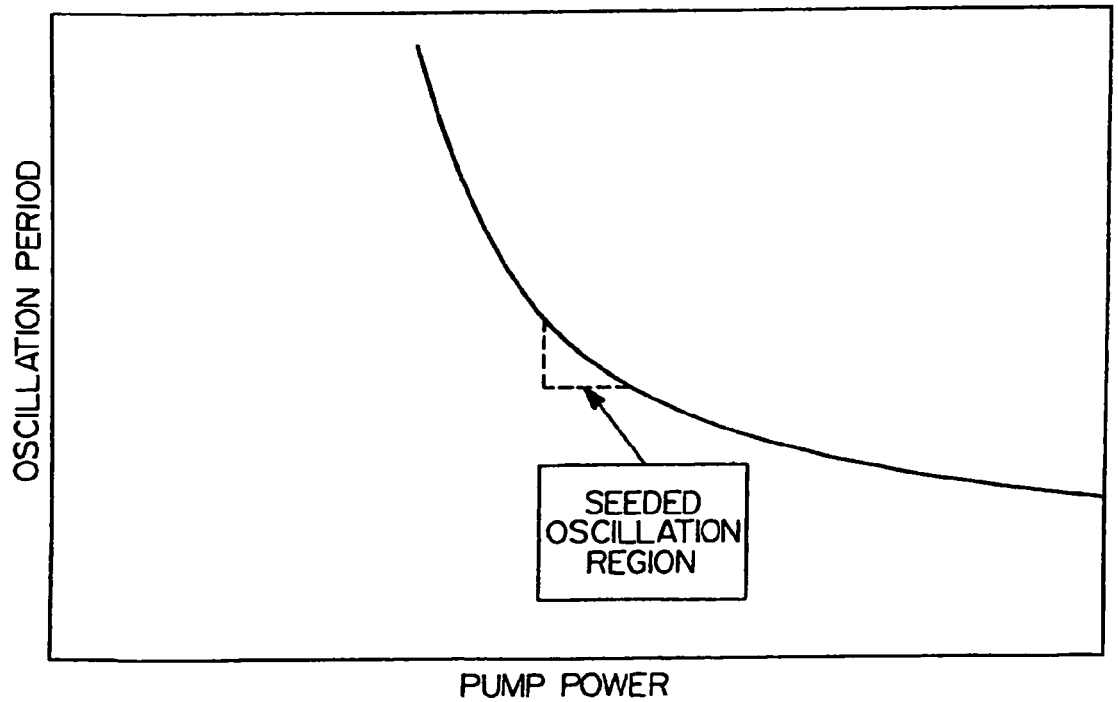
FIG. 2 is a graph of pump power vs. oscillation period indicating the seeded oscillation region.

Referring now to FIG. 2, the relationship between the pump power to the laser and the relaxation oscillation period can be seen in greater detail. In the absence of seed pulses inducing locking of the relaxation oscillator, the oscillation period decreases with increasing pump power. In the region where the relaxation oscillation period is locked, due to the seeding of the laser cavity 16, the relaxation oscillation period remains at a constant value over a small range of pump power, as shown by the dashed lines. The function of the controller 26 is to identify this discontinuity in the relationship between the pump power and the oscillation period, hence determining the period of the locked oscillation and therefore the round-trip time of flight of the optical pulse to the down range target 28. There are multiple methods for determining the presence of the discontinuity discussed above. For example, the controller 26 may gradually increase the pump power from an initial low power to a high power while it simultaneously measures the relaxation oscillation period. The controller 26 may mathematically identify the discontinuities in the relationship of the oscillation period to the pump power.

Figure 3A:
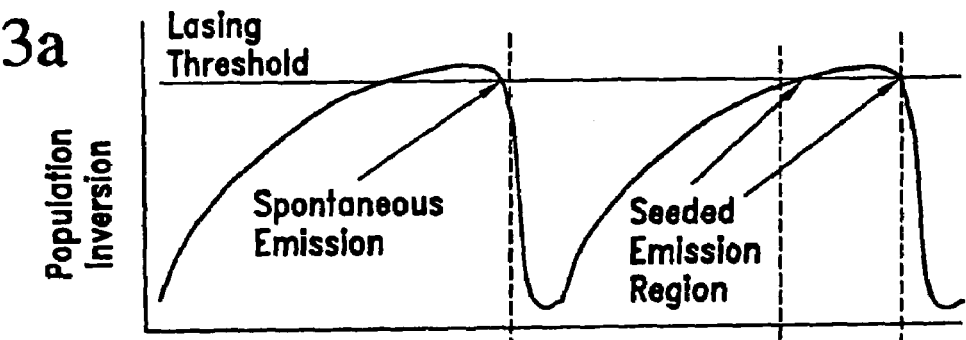
FIGS. 3a–3c are three graphs relating to the instance where the pump power is too low for seeded oscillation.

Referring to FIG. 3a, a low pump power causes a slow rise in the population inversion until the population inversion exceeds the lasing threshold, defined as the point when the overall gain of the cavity 16 exceeds unity. A further rise in the population inversion monotonically increases the cavity gain up to the point when a pulse is spontaneously emitted from the cavity 16. A seed pulse is injected into the cavity 16 during the time that the population inversion is above threshold, but before the occurrence of a spontaneous emission pulse will induce a subsequent pulse from the cavity. This period of time, identified in FIG. 3a as the "Seeded Emission Region", performs the function of range gating any return pulses injected into the cavity 16. The distance from the laser rangefinding apparatus 10 to the reflecting target 28 must lie within the narrow distance range such that the time of flight of a transmitted pulse results in its reception and injection into the laser cavity during the seeded emission region period.

Figure 3B:
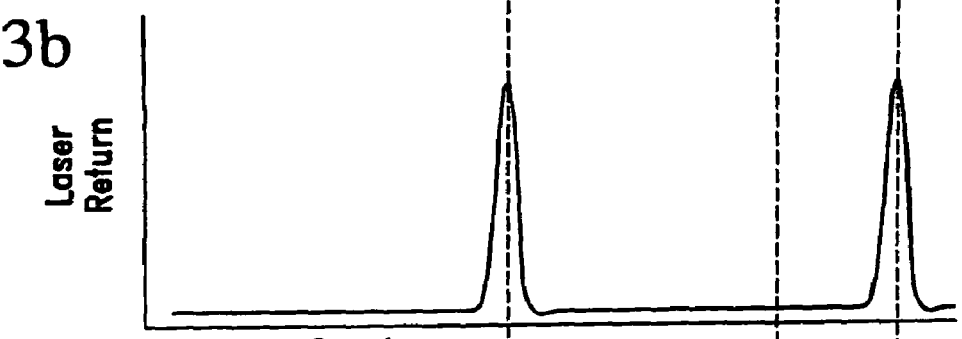

FIG. 3b shows the optical output as the laser cavity 16 spontaneously emits a pulse and extracts energy from the population inversion. As the pump power again increases the population inversion, the first spontaneous pulse is reflected from the down range target 28 and this seed pulse is injected into the laser cavity 16.

Figure 3C:
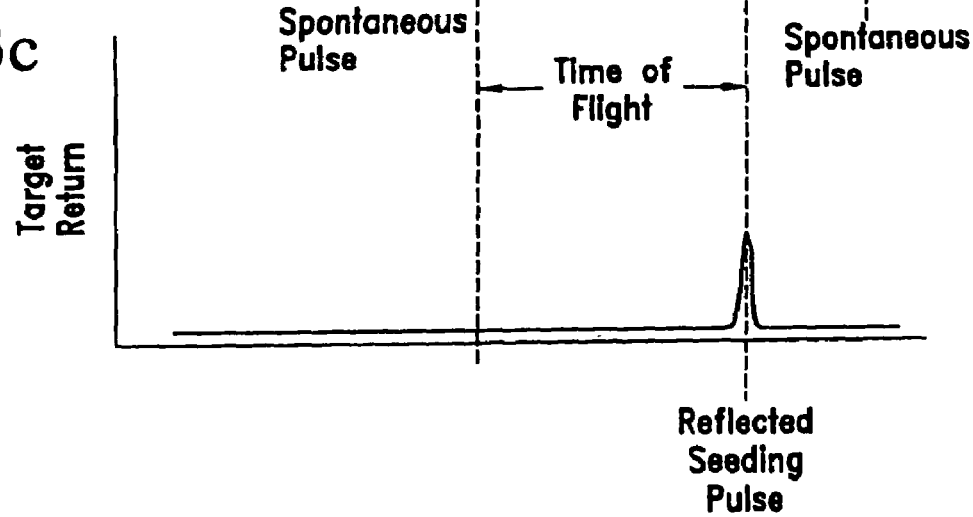

FIG. 3c shows that the time of flight of this pulse is shorter than the population inversion build up time required for the laser cavity 16 to reach lasing threshold. The seed pulse is therefore unable to induce the subsequent output pulse from the laser cavity 16. This condition indicates that the distance to the reflecting target 28 is too short to produce locked oscillations at the selected pump power.

Figure 4A:
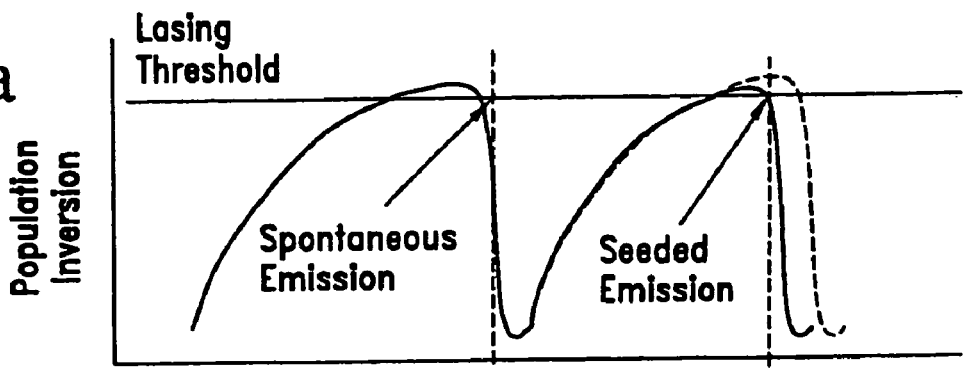
FIGS. 4a–4c are three graphs relating to the instance where the pump power is correct for seeded oscillation.
Figure 4B:
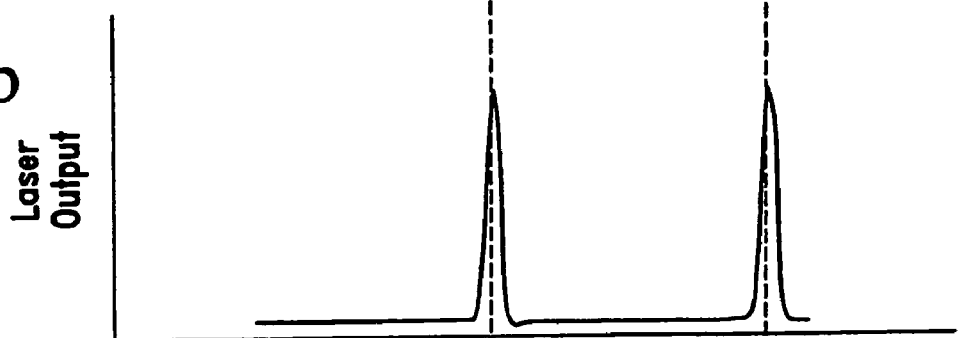
Figure 4C:
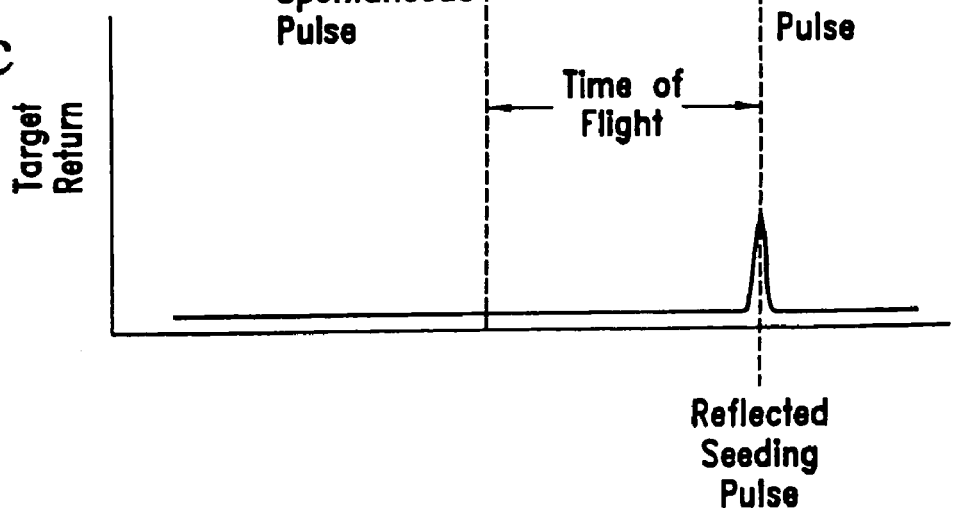

FIG. 4a shows the operation of the relaxation oscillation when the pump power is adjusted to allow locked oscillation. Again, a spontaneous pulse is emitted from the laser cavity 16. The return seed pulse is injected into the cavity 16 at a time when the population inversion is greater than threshold, but before the spontaneous build up time of the cavity shown by dashed lines. The timing of the seed pulse is seen in FIG. 4c. The timing of the seeded output from the cavity 16 matches the injected seed pulse as shown in FIG. 4b. This cycle is repeated for subsequent locked pulses.

Figure 5A:
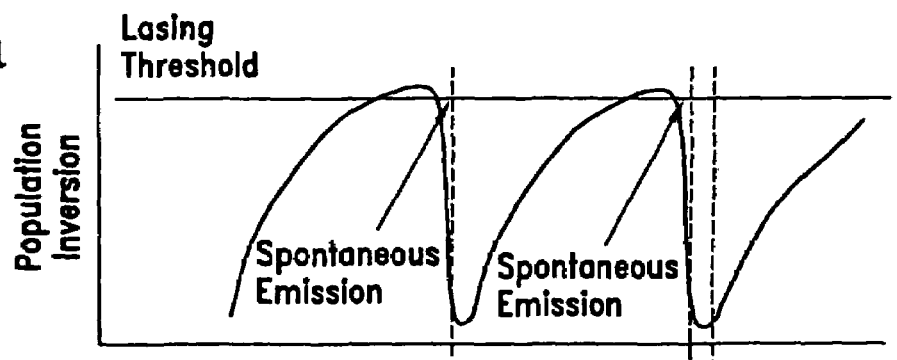
FIGS. 5a–5c are three graphs relating to the instance where the pump power is too high for seeded oscillation.
Figure 5B:
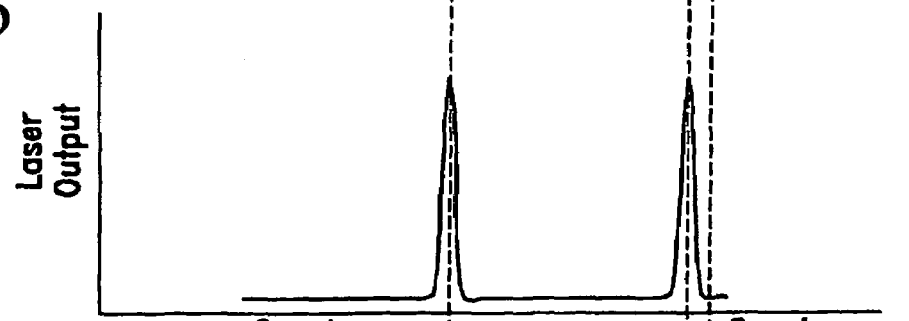
Figure 5C:
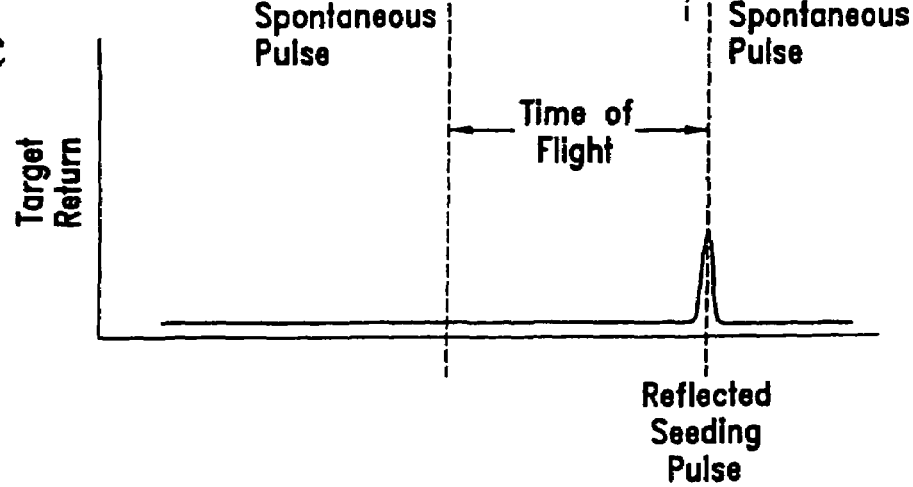

Finally, FIG. 5a shows the operation of the relaxation oscillation when the pump power is too high for locked oscillation. The seed pulse, resulting from the first spontaneous pulse, as shown in FIG. 5c, is injected into the laser cavity 16 after the cavity has generated the subsequent spontaneous pulse shown in FIG. 5b. Since the population inversion is below the lasing threshold at the time the seed pulse is injected, the seed pulse does not induce a subsequent output pulse from the laser cavity 16. This condition indicates that the distance to the reflecting target 28 is too long to produce locked oscillations at the selected pump power.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

The invention claimed is:

1. A laser range finding apparatus, comprising:
   an oscillator for producing a series of optical pulses having a controlled repetition rate;
   an optical subsystem for receiving said optical pulses for passing therethrough a first portion of optical energy generated by said optical pulses to a target, and redirecting a second portion of said optical energy; and
   a control subsystem responsive to said second portion of said optical energy for determining a repetition period between said optical pulses, and for applying a signal to said oscillator to adjust said controlled repetition rate,
   said first portion of said optical energy being reflected by said target back to said optical subsystem for use to control the generation of subsequent optical pulses from said oscillator in relation to a round trip time of flight of said optical pulses between said apparatus and said target, said time of flight being used to extrapolate a distance between said laser oscillator and said target.

2. The apparatus of claim 1, said oscillator comprising an optical relaxation oscillator.

3. The apparatus of claim 1, said optical subsystem comprising an optical beam splitter.

4. The apparatus of claim 1, said control subsystem comprising:
   a photodetector responsive to said second portion of said optical energy for generating an electrical signal representative of said controlled repetition rate; and
   a controller responsive to an output of said photodetector for generating said signals for adjusting said controlled repetition rate.

5. A method for determining a distance to a target, comprising:
   generating a plurality of relaxation oscillations having a controlled frequency;
   using said relaxation oscillations to generate a series of optical pulses at a controlled repetition rate;
   splitting optical energy generated by said optical pulses into first and second portions;
   causing said first portion of optical energy generated by said optical pulses to be directed at said target spaced apart a distance from an apparatus generating said relaxation oscillations;
   using said second portion of said optical energy to determine a repetition rate of said optical pulses;
   using said determined repetition rate to adjust a repetition rate of subsequently generated optical pulses;
   collecting at least a portion of said first portion said optical energy reflected from said target and using said collected optical energy to further control the generation of said subsequent relaxation oscillations, and therefore subsequent optical pulses, in relation to a round trip time of flight of said collected optical energy between said apparatus and said target; and
   using said round trip time of flight to calculate said distance between said apparatus and said target.

6. A method of determining a distance between a reference point and a target using a laser oscillator, comprising:
   using a laser oscillator located at said reference point to generate relaxation oscillations that in turn cause a plurality of optical pulses to be generated at a controlled repetition rate;
   directing said optical pulses at a target located at an unknown distance from said laser oscillator;
   adjusting a power of a laser pump used with said laser oscillator to thus vary a frequency of said relaxation oscillations, and thus vary a frequency of said optical pulses; and
   detecting when a received optical pulse reflected from said target has seeded a pump cavity of said laser oscillator and caused a subsequent, seeded optical pulse to be generated by said laser oscillator; and
   when said subsequent, seeded optical pulse is generated, locking a period of each subsequently generated relaxation oscillation.

* * * * *